(12) United States Patent
Maede

(10) Patent No.: US 10,564,747 B2
(45) Date of Patent: Feb. 18, 2020

(54) DISPLAY DEVICE AND SENSOR DEVICE

(71) Applicant: Japan Display Inc., Minato-ku (JP)

(72) Inventor: Yuji Maede, Tokyo (JP)

(73) Assignee: Japan Display Inc., Minato-ku (JP)

( * ) Notice: Subject to any disclaimer, the term of this patent is extended or adjusted under 35 U.S.C. 154(b) by 223 days.

(21) Appl. No.: 15/598,647

(22) Filed: May 18, 2017

(65) Prior Publication Data

US 2017/0336898 A1    Nov. 23, 2017

(30) Foreign Application Priority Data

May 18, 2016    (JP) .................................. 2016-099551

(51) Int. Cl.
*G06F 3/041*    (2006.01)
*G02F 1/1333*    (2006.01)
(Continued)

(52) U.S. Cl.
CPC ........ *G06F 3/0412* (2013.01); *G02F 1/13394* (2013.01); *G02F 1/133345* (2013.01); *G02F 1/134309* (2013.01); *G06F 3/044* (2013.01); *G02F 1/13338* (2013.01); *G02F 2201/121* (2013.01); *G02F 2201/123* (2013.01);
(Continued)

(58) Field of Classification Search
CPC ...... G06F 3/0412; G06F 3/044; G06F 3/0416; G06F 2203/04111; G06F 3/3648; G02F 1/133345; G02F 1/13394; G02F 1/134309; G02F 1/13338; G02F 2201/121; G02F 2201/123
See application file for complete search history.

(56) References Cited

U.S. PATENT DOCUMENTS

2011/0267293 A1    11/2011 Noguchi et al.
2012/0050659 A1    3/2012 Nakanishi et al.
(Continued)

FOREIGN PATENT DOCUMENTS

JP    2011-233018    11/2011
JP    2012-47807    3/2012
(Continued)

OTHER PUBLICATIONS

Office Action dated Oct. 23, 2019 in Japanese Patent Application No., 2016-099551, citing documents AO and AP therein, with English-language translation, 6 pages.

*Primary Examiner* — Patrick N Edouard
*Assistant Examiner* — Eboni N Giles
(74) *Attorney, Agent, or Firm* — Oblon, McClelland, Maier & Neustadt, L.L.P.

(57) ABSTRACT

According to one embodiment, a display device includes a first signal line covered by a first interlayer insulating film, a first metallic wiring line provided on the first interlayer insulating film to overlap the first signal line, a pixel electrode next to the first metallic wiring line, a second interlayer insulating film covers the first metallic wiring line and the pixel electrode, and first and second common electrodes provided on the second interlayer insulating film, a gap between the first common electrode and the second common electrode, which overlap the first signal line and the first metallic wiring line, and the first metallic wiring line being connected to the first common electrode in a non-display area.

15 Claims, 14 Drawing Sheets

(51) Int. Cl.
  *G02F 1/1339* (2006.01)
  *G02F 1/1343* (2006.01)
  *G06F 3/044* (2006.01)
  *G09G 3/36* (2006.01)

(52) U.S. Cl.
  CPC .. *G06F 3/0416* (2013.01); *G06F 2203/04111* (2013.01); *G09G 3/3648* (2013.01)

(56) References Cited

U.S. PATENT DOCUMENTS

| | | | |
|---|---|---|---|
| 2013/0038830 A1* | 2/2013 | Sato | G02F 1/134363 349/149 |
| 2015/0185578 A1* | 7/2015 | Hirosawa | G02F 1/133707 349/43 |
| 2016/0042709 A1 | 2/2016 | Nakanishi et al. | |
| 2017/0003530 A1* | 1/2017 | Hirosawa | G02F 1/134309 |
| 2017/0168333 A1* | 6/2017 | Kubota | H01L 27/1259 |
| 2017/0322469 A1* | 11/2017 | Shin | G02F 1/133345 |

FOREIGN PATENT DOCUMENTS

| | | |
|---|---|---|
| JP | 2013-122752 | 6/2013 |
| WO | WO 2015/059995 A1 | 4/2015 |

\* cited by examiner

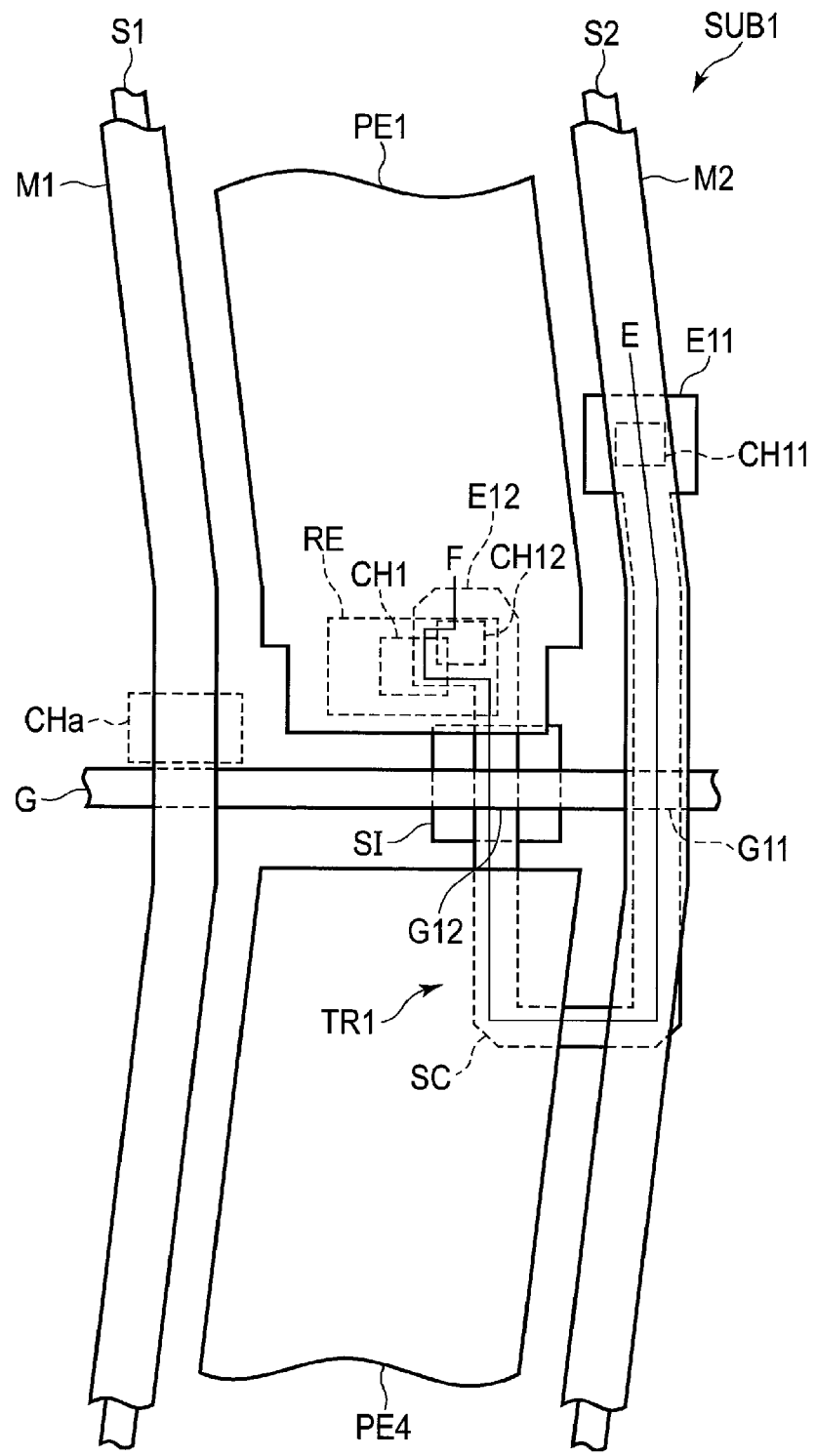
F I G. 6

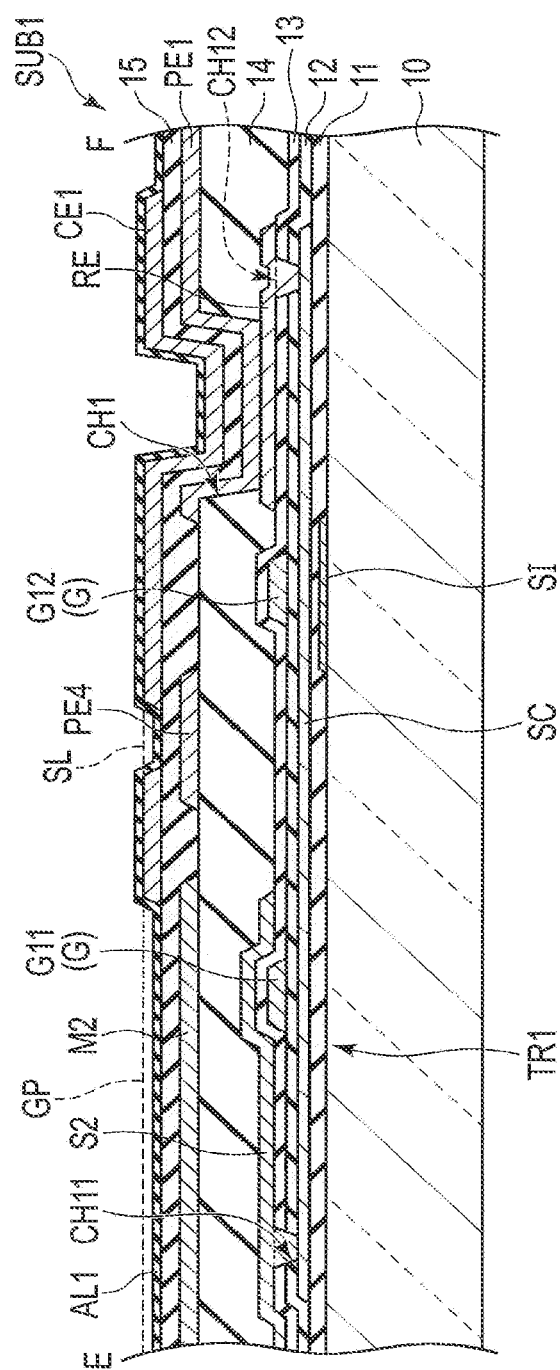
F I G. 7

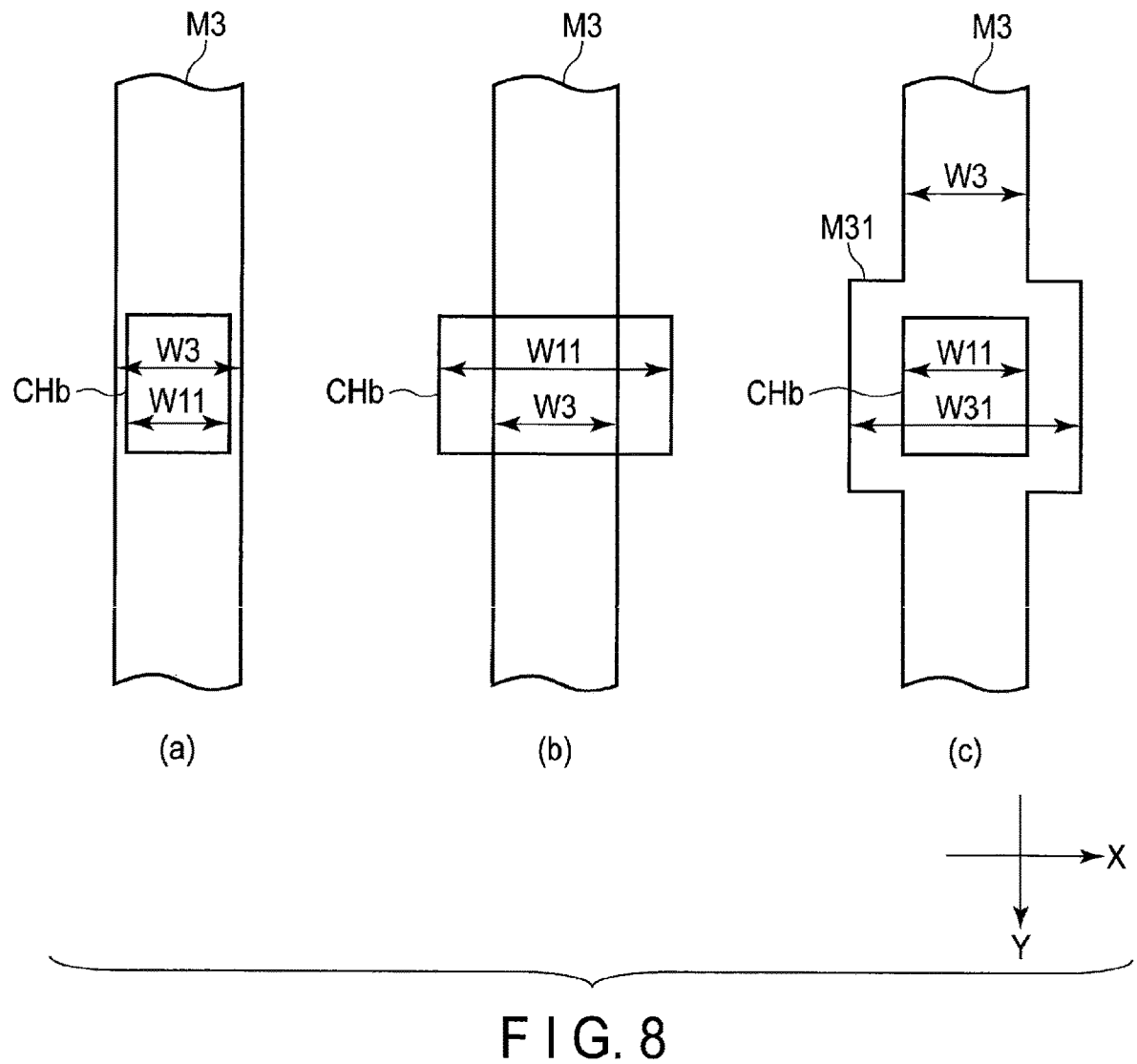
F I G. 8

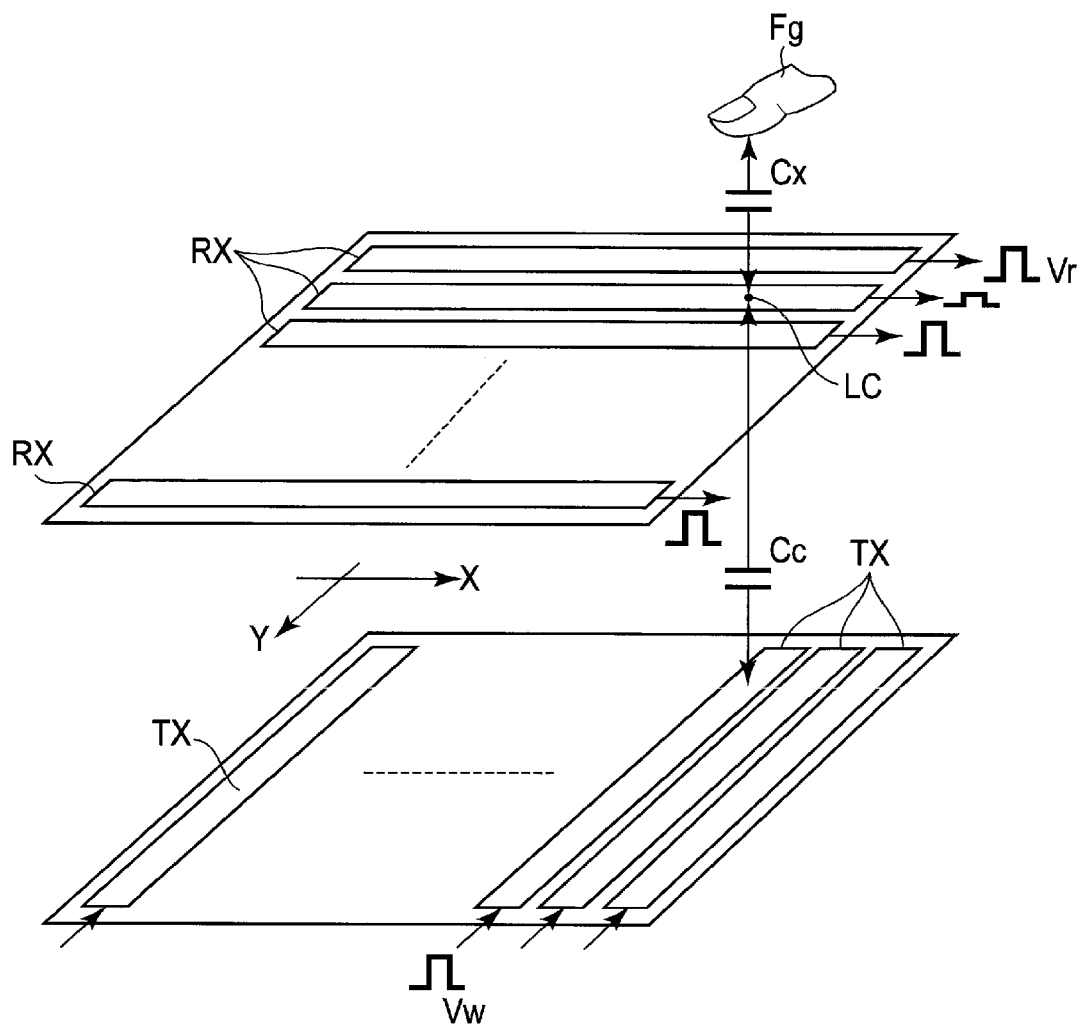
F I G. 11

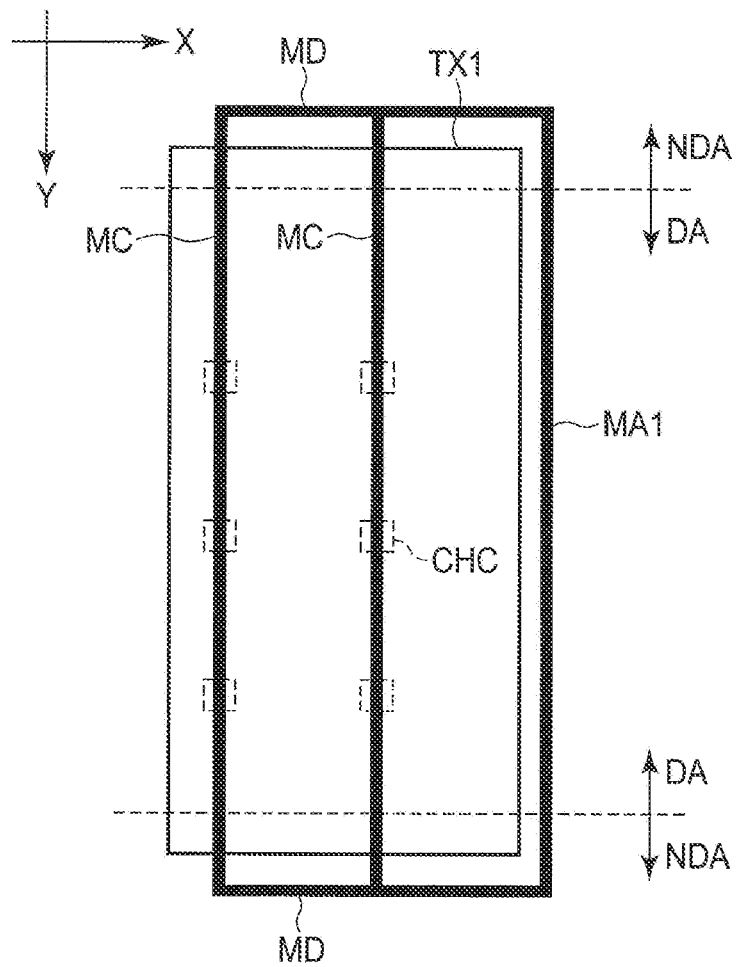
F I G. 14

DISPLAY DEVICE AND SENSOR DEVICE

CROSS-REFERENCE TO RELATED APPLICATIONS

This application is based upon and claims the benefit of priority from Japanese Patent Application No. 2016-099551, filed May 18, 2016, the entire contents of which are incorporated herein by reference.

FIELD

Embodiments described herein relate generally to a display device and a sensor device

BACKGROUND

In recent years, touch-detection function display devices comprising drive electrodes and detection electrodes have been developed. The drive electrodes of touch detection devices also function as common electrodes of the display device, and as one example, the technique of arranging drive electrodes to extend in the same direction as that of signal lines is known. Such a display device is required to suppress the degradation of display quality.

BRIEF DESCRIPTION OF THE DRAWINGS

FIG. 6 is a plan view showing a structural example of switching elements.

FIG. 7 is a cross section showing the structure of a first substrate SUB1 including a switching element TR1 taken along line E-F of FIG. 6.

FIG. 8 is a plan view showing the relationship between metallic wiring lines and contact holes in width.

FIG. 11 is a diagram illustrating a principle of a sensing method.

FIG. 14 a plan view showing another example of the connection relationship between drive electrodes and metallic wiring lines.

DETAILED DESCRIPTION

Figure 1:
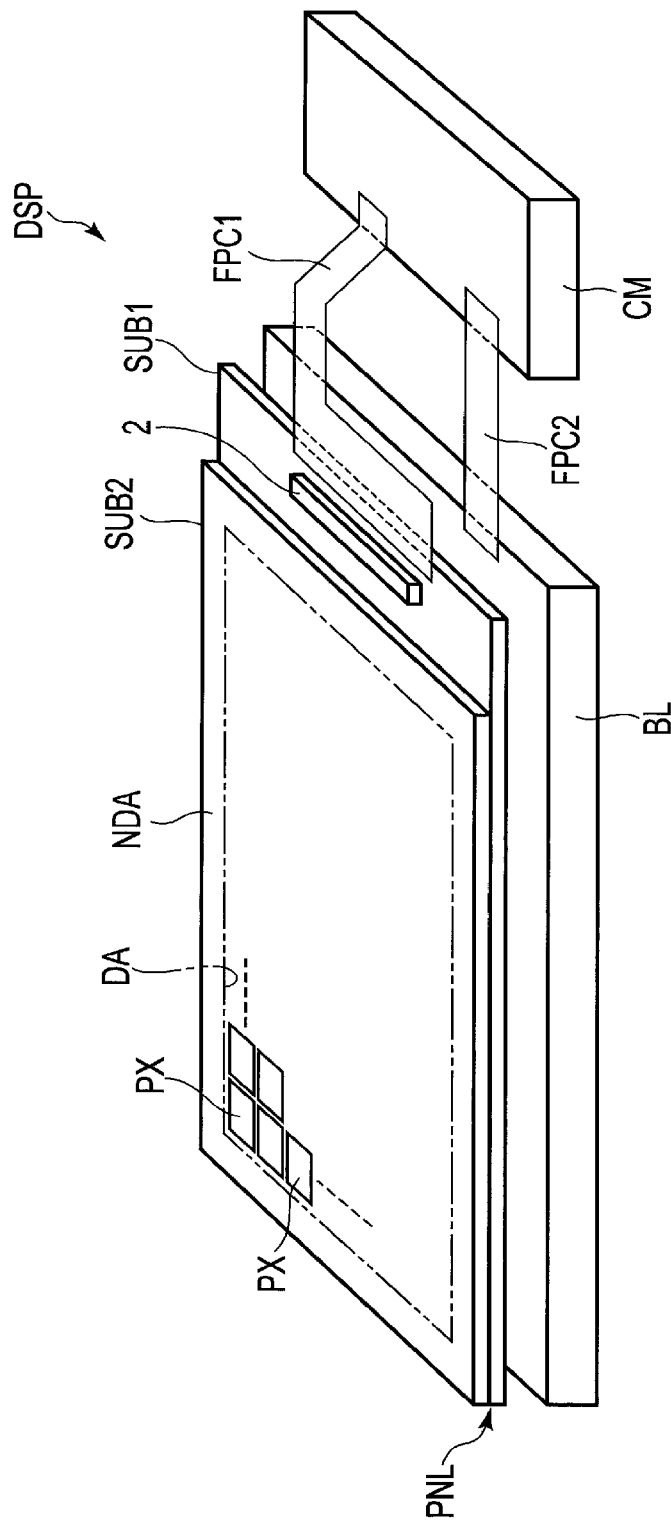
FIG. 1 is a perspective view showing the structure of a display device.

In general, according to one embodiment, a display device comprises: a display area which displays images; a non-display area surrounding the display area; a first signal line; a second signal line separated from the first signal line; a first interlayer insulating film provided to cover the first signal line and the second signal line; first and second metallic wiring lines provided on the first interlayer insulating film to overlap the first signal line and the second signal line, respectively; a pixel electrode provided on the first interlayer insulating film and between the first metallic wiring line and the second metallic wiring line; a second interlayer insulating film provided to cover the first metallic wiring line, the second metallic wiring line and the pixel electrode; and first and second common electrodes provided on the second interlayer insulating film, the first common electrode and the second common electrode being separated from each other with a gap therebetween, which overlap the first signal line and the first metallic wiring line, and the second signal line and the second metallic wiring line overlapping the second common electrode, and the second metallic wiring line being connected to the second common electrode through a contact hole formed in the second interlayer insulating film in the display area, the contact hole overlapping the second signal line, and the first metallic wiring line being connected to the first common electrode in the non-display area.

According to another embodiment, a sensor device comprises: a detection region to detect a position of a detection object; a non-detection region located outside the detection region; a first metallic wiring line; a second metallic wiring line located apart from the first metallic wiring line; an interlayer insulating film provided to cover the first metallic wiring line and the second metallic wiring line; and first and second sensor electrodes provided on the interlayer insulating film, the first sensor electrode and the second sensor electrode being separated from each other with a gap therebetween, which overlap the first metallic wiring line, the second metallic wiring line overlapping the second sensor electrode, the second metallic wiring line being connected to the second sensor electrode through a contact hole formed in the interlayer insulating film in the detection region, and the first metallic wiring line being connected to the first sensor electrode in the non-detection region.

According to yet another embodiment, a display device comprises: a signal line; a first interlayer insulating film provided to cover the signal line; a metallic wiring line provided on the first interlayer insulating film to overlap the signal line; a second interlayer insulating film provided to cover the metallic wiring line; and first and second transparent electrodes provided on the second interlayer insulating film, the first transparent electrode and the second transparent electrode being separated from each other with a gap therebetween, which overlaps the signal line and the metallic wiring line, and the metallic wiring line being electrically connected to the first transparent electrode.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First, a display device according to an embodiment will be described in detail.

In this embodiment, a liquid crystal display device will be described as an example of the display device. For example, the liquid crystal display device can be used in various devices such as smartphones, tablet computers, mobile-phones, notebook computers, TVs, in-car devices, and game consoles. The major configuration explained in this embodiment can also be applied to a self-luminous display device comprising an organic electroluminescent display element and the like, an electronic-paper display device comprising an electrophoretic element and the like, a display device employing micro-electro-mechanical systems (MEMS), or a display device employing electrochromism.

FIG. 1 is a perspective view schematically showing a configuration of a display device DSP.

The display device DSP comprises an active matrix type display panel PNL, a driving IC chip 2 which drives the display panel PNL, a backlight unit BL which illuminates the display panel PNL, a control module CM, flexible printed circuits FPC1 and FPC2, and the like.

The display panel PNL includes a first substrate SUB1 and a second substrate SUB2 disposed to oppose the first substrate SUB1. The display panel PNL includes a display area DA for image display and a frame-like non-display area NDA around the display area DA. A plurality of pixels PX are arrayed in a matrix in the display area DA.

The backlight unit BL is disposed on a rear surface side of the first substrate SUB1. As the structure of the backlight unit BL, various modifications can be applied, but a detailed explanation of the structure will be omitted. The driving IC chip 2 is mounted on the first substrate SUB1. The flexible printed circuit FPC1 connects the display panel PNL and the control module CM to each other. The flexible wiring board FPC2 connects the backlight unit BL and the control module CM to each other.

The display device DSP of such a structure is equivalent to a transmissive liquid crystal display comprising a transmissive display function of displaying images by selectively transmitting the light entering the display panel PNL from the backlight unit BL by each pixel PX. The display device DSP may be a reflective liquid crystal display comprising a reflective display function of displaying images by selectively reflecting external light or fill light, or a transreflective liquid crystal display comprising a transmissive display function and a reflective display function.

Figure 2:
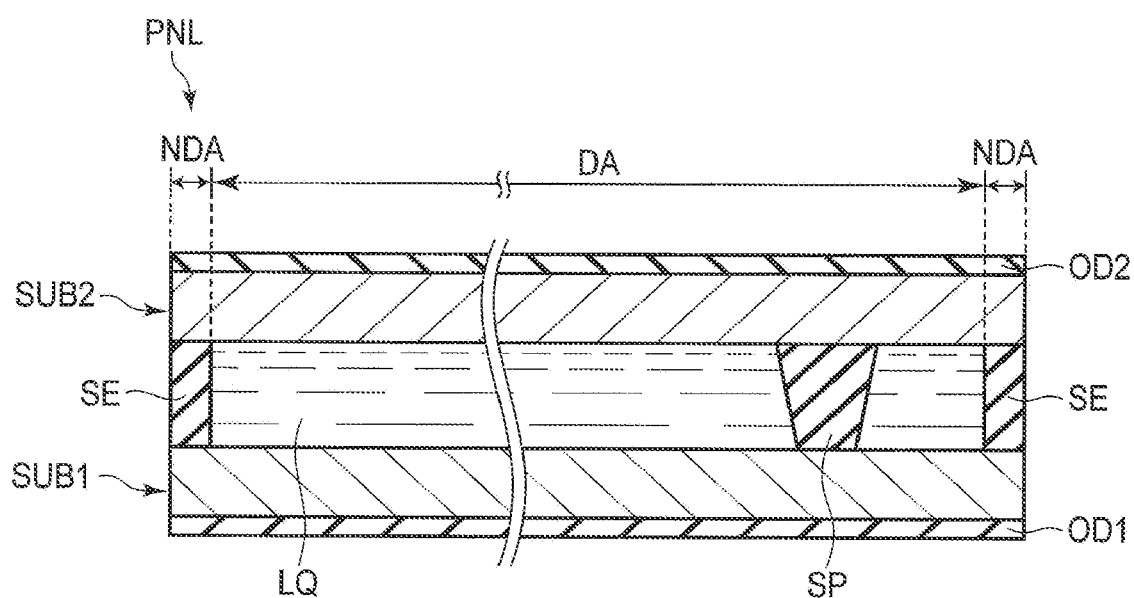
FIG. 2 is a diagram schematically showing a cross section of a display panel.

FIG. 2 is a schematic diagram showing a cross section of the display panel PNL. The display panel PNL includes the first substrate SUB1, the second substrate SUB2, a liquid crystal layer LQ, a sealing member SE, a spacer SP, an optical element OD1, an optical element OD2, etc. The first substrate SUB1 and second substrate SUB2 will be described in detail later.

The sealing member SE is disposed on the non-display area NDA to attach the first substrate SUB1 and the second substrate SUB2 together. The spacer SP is located between the first substrate SUB1 and the second substrate SUB2. In the example illustrated, the spacer SP2 is formed on the second substrate SUB2. The liquid crystal layer LQ is held between the first substrate SUB1 and the second substrate SUB2. The optical element OD1 is disposed on a surface of the first substrate SUB1, which opposes the second substrate SUB2. The optical element OD2 is disposed on a surface of the second substrate SUB2, which opposes the first substrate SUB1. The optical elements OD1 and OD2 each comprise a polarizer. Note that the optical elements OD1 and OD2 may include some other optical element such as a retardation film.

Figure 3:
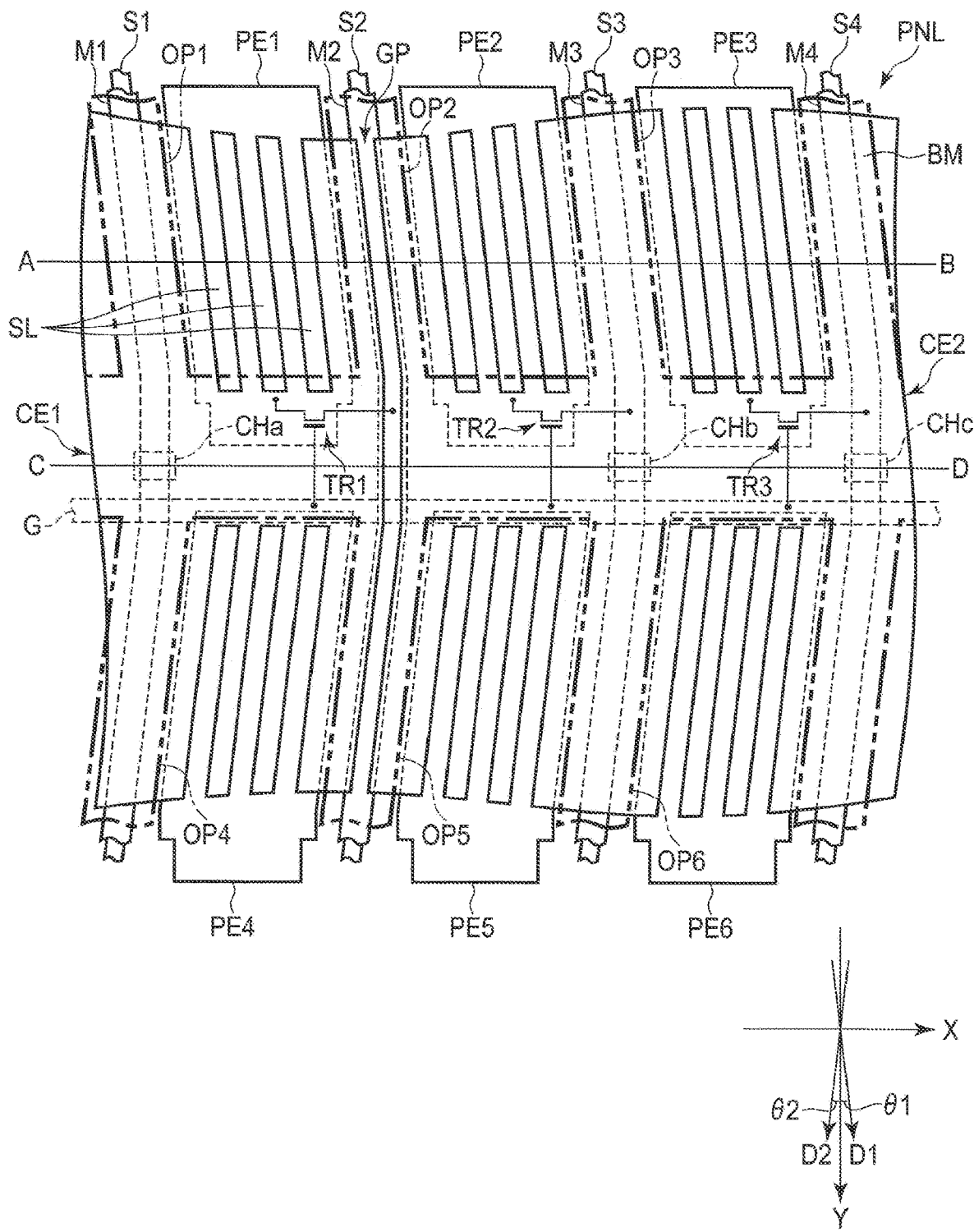
FIG. 3 is a plan view showing the structure in the display area of the display panel shown in FIG. 1.

FIG. 3 is a plan view showing the structure in display area DA of the display panel PNL shown in FIG. 1. In this embodiment, the display panel PNL is applied to the mode utilizing the lateral electric field along the main surface of the substrate, such as an In-Plane Switching (IPS) mode, a Fringe Field Switching (FFS) mode, which is one of the IPS modes, or the like. Note that only the main portions necessary for explanation are shown in the figure.

Here, FIG. 3 shows a plan view of the display panel PNL in an X-Y plane defined by a first direction X and a second direction crossing with each other. In the example illustrated, the first direction X and second direction Y are orthogonal to each other, but they may cross each other at any degrees other than 90°. Further, in the figure, a direction crossing the second direction Y anticlockwise at an acute angle is defined as a direction D1, and a direction crossing the second direction Y clockwise at an acute angle is defined as a direction D2. Note that an angle θ1 made between the second direction Y and the direction D1 is substantially the same as an angle θ2 made between the second direction Y and the direction D2.

As shown in FIG. 3, the display panel PNL comprises a scanning line G, signal lines S1 to S4, switching elements TR1 to TR3, metallic wiring lines M1 to M4, pixel electrodes PE1 to PE6, common electrodes CE1 and CE2, a light-shielding layer BM, etc.

The scanning line G extends along the first direction X. The signal lines S1 to S4 each extended substantially along the second direction Y and are arranged along the first direction X with gaps therebetween. In the example illustrated, the signal lines S1 to S4 extended along the direction D1 on an upper side with respect to the scanning line G, (a rear end side of the arrow indicating the second direction Y), whereas they extend along the direction D2 on a lower side with respect to the scanning line G (a leading end side of the arrow indicating the second direction Y). The scanning line G and the signal lines S1 to S4 cross each other in the X-Y plane.

The switching element TR1 is located near the intersection of the scanning line G and the signal line S2, and electrically connected to the scanning line G and the signal line S2. The switching element TR2 is located near the intersection of the scanning line G and the signal line S3, and electrically connected to the scanning line G and the signal line S3. The switching element TR3 is located near the intersection of the scanning line G and the signal line S4 and electrically connected to the scanning line G and the signal line S4. Note that the switching elements TR1 to SW3 are simplified in the figure, but will be described in detail later.

The metallic wiring lines M1 to M4 each extend substantially along the second direction Y, and are arranged along the first direction X with gaps therebetween. The metallic wiring lines M1 to M4 overlaps the signal lines S1 to S4, respectively, and extend parallel to the signal lines S1 to S4, respectively. Further, the metallic wiring lines M1 to M4 cross the scanning line G in the X-Y plane. The metallic wiring lines M1 to M4 are formed to have the same width along the first direction X. The metallic wiring lines M1 to M4 should preferably have the same widths or more of those of the signal lines S1 to S4, respectively.

The pixel electrodes PE1 to PE3 are arranged along the first direction X with gaps therebetween. Further, the pixel electrodes PE4 to PE6 are arranged along the first direction X with gaps therebetween. The pixel electrodes PE1 and PE4 are located between the signal lines S1 and S2 and arranged with gaps therebetween along the second direction Y via the scanning line G interposed. The signal lines S2 and S3 are located between the pixel electrodes PE2 and PE5 and arranged with gaps therebetween along the second direction Y via the scanning line G interposed. The pixel electrodes PE3 and PE6 are located between the signal lines S3 and S4 and arranged with gaps therebetween along the second direction Y via the scanning line G interposed.

The common electrode CE1 is disposed to overlap the signal line S1, the metallic wiring line M1, and the pixel electrodes PE1 and PE4. The common electrode CE2 is disposed to overlap the signal lines S3 and S4, the metallic wiring lines M3 and M4, and the pixel electrodes PE2, PE3, PE5 and PE6. As will be described later, the common electrodes CE1 and CE2 are formed into a belt-like shape and a gap GP is formed between the common electrodes CE1 and CE2. The gap GP overlaps the signal line S2 and the metallic wiring line M2, and is formed along the signal line S2 and the metallic wiring line M2. The common electrodes CE1 and CE2 each comprise slits SL at positions which overlap the pixel electrodes PE1 to PE6, respectively. The slits SL formed at the positions overlapping the pixel electrodes PE1 to PE3, respectively, are arranged along the direction D1. The slits SL formed at the positions overlapping the pixel electrodes PE4 to PE6, respectively, are arranged along the direction D2. In the example illustrated, the number of slits SL formed at the positions which overlap one pixel electrode is three, but it is not limited to this.

As will be described later, the contact holes CHa, CHb and CHc are formed in insulating films between the metallic wiring lines M1 to M4 and the common electrodes CE1 and CE2. The contact hole CHa is formed at a position which overlaps the signal line S1 and the metallic wiring line M1. The metallic wiring line M1 is connected to the common electrode CE1 through the contact hole CHa. The contact hole CHb is formed at a position which overlaps with the signal line S3 and the metallic wiring line M3. The metallic wiring line M3 is connected to the common electrode CE2 through the contact hole CHb. The contact hole CHc is formed at a position which overlaps the signal line S4 and the metallic wiring line M4. The metallic wiring line M4 is connected to the common electrode CE2 through the contact hole CHc.

The light-shielding layer BM is disposed in a region which overlaps wiring lines such as the scanning line G, the signal lines S1 to S4, the metallic wiring lines M1 to M4 and the like. The light-shielding layer BM is illustrated by two-dot chain line in FIG. 3. The light-shielding layer BM defines openings OP1 to OP6. The openings OP1 to OP6 include respective regions where the pixel electrodes PE1 to PE6, respectively, overlap the slits SL of the common electrodes CE1 and CE2.

Here, the above-provided example describes the case where the signal lines S1 to S4 are bent with respect to the second direction Y, but the signal lines S1 to S4 may extend straight along the second direction Y.

Figure 4:
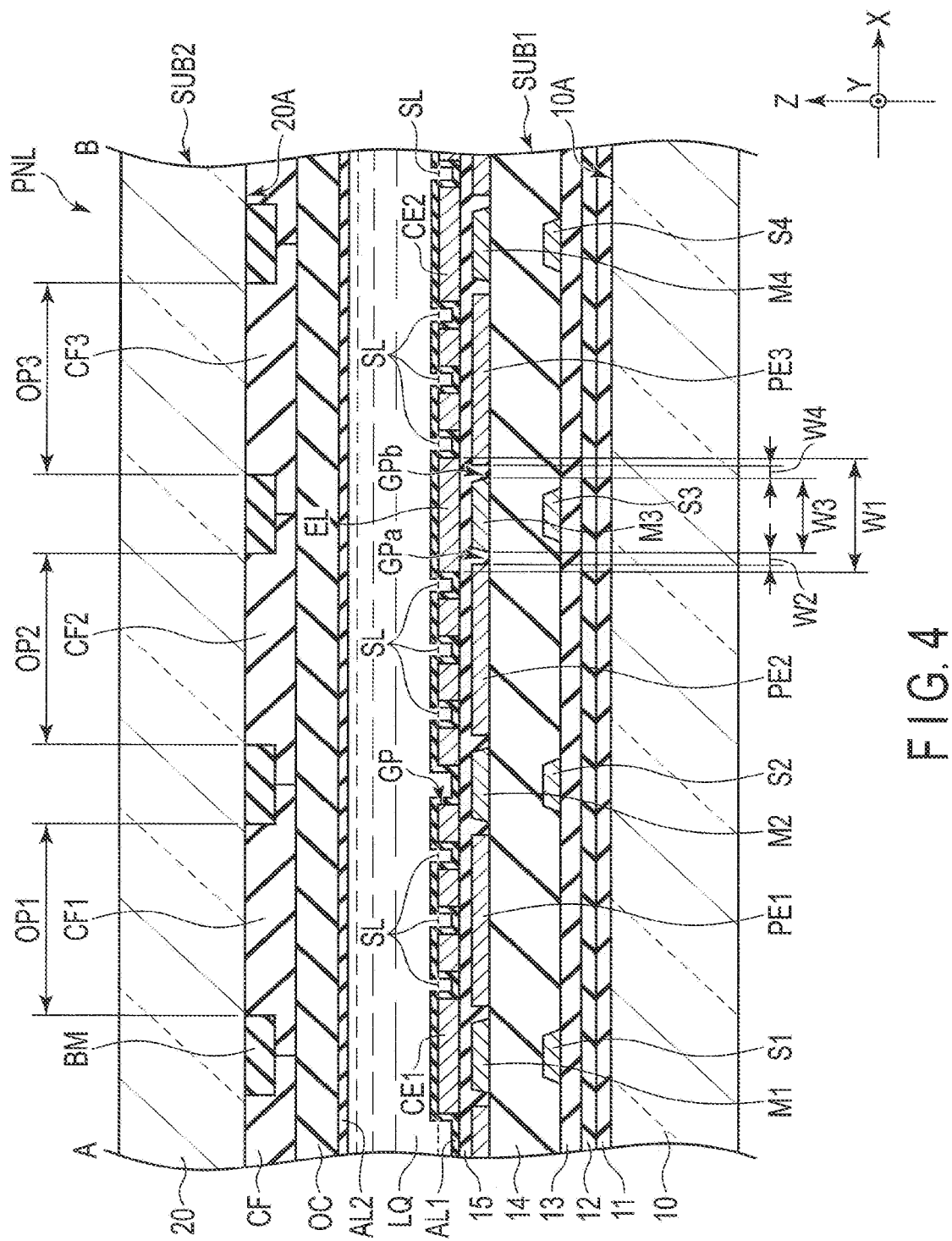
FIG. 4 is a cross section showing an example of the structure of the display panel taken along line A-B of FIG. 3.

FIG. 4 is a cross section showing the structure of the display panel PNL taken along in line A-B of FIG. 3.

In this embodiment, the direction towards the second substrate SUB2 from the first substrate SUB1 is defined as up or above, and the direction towards the first substrate SUB1 from the second substrate SUB2 is defined as down or below. Moreover, such expressions as "the second member above the first member" and "the second member below the first member", the second member may be in contact with the first member or may be separated from the first member. In the case of the latter, the third member may be interposed between the first member and the second member. Meanwhile, such expressions as "the second member on the first member" and "the second member under the first member", the second member is in contact with the first member.

The first substrate SUB1 comprises a first insulating substrate 10, which is a light-transmissive substrate such as a glass or resin substrate. The first substrate SUB1 comprises, on a side of a surface 10A of the first insulating substrate 10, which oppose the second substrate SUB2, a first insulating film 11, a second insulating film 12, a third insulating film 13, the metallic wiring lines M1 to M4, the pixel electrodes PE1 to PE3, the fifth insulating film 15, the common electrodes CE, a first alignment film AL1 and the like.

The first insulating film 11 is disposed on the first insulating substrate 10. The second insulating film 12 is disposed on the first insulating film 11. The third insulating film 13 is disposed on the second insulating film 12. The signal lines S1 to S4 are arranged on the third insulating film 13. The signal lines S1 to S4 are arranged with respective gaps therebetween along the first direction X. The fourth insulating film 14 covers the signal lines S1 to S4. The fourth insulating film 14 is disposed also on the third insulating film 13. The fourth insulating film 14 is equivalent to a first interlayer insulating film.

The metallic wiring lines M1 to M4 are arranged on the fourth insulating film 14. The metallic wiring lines M1 to M4 are located immediately above the signal lines S1 to S4, respectively. The metallic wiring lines M1 to M4 are formed from a monolayer or multilayer of, for example, molybdenum, aluminum and molybdenum. The pixel electrodes PE1 to PE3 are arranged on the fourth insulating film 14. The pixel electrode PE1 is located between the metallic wiring line M1 and the metallic wiring line M2. The pixel electrode PE2 is located between the metallic wiring line M2 and the metallic wiring line M3. The pixel electrode PE3 is located between the metallic wiring line M3 and the metallic wiring line M4. The pixel electrodes PE1 to PE3 and the metallic wiring lines M1 to M4 are separated from each other. The pixel electrode PE is formed from, for example, a transparent conductive material such as indium-tin-oxide (ITO) or indium-zinc-oxide (IZO). The fifth insulating film 15 covers the metallic wiring lines M1 to M4 and the pixel electrodes PE1 to PE3. The fifth insulating film 15 is equivalent to a second interlayer insulating film.

The common electrodes CE1 and CE2 are arranged on the fifth insulating film 15. The common electrode CE1 opposes the pixel electrode PE1 and the common electrode CE2 opposes the pixel electrodes PE2 and PE3. The gap GP between the common electrodes CE1 and CE2 is located immediately above the signal line S2 and the metallic wiring lines M2. The common electrodes CE are each formed from, for example, a transparent conductive material such as ITO or IZO. The common electrodes CE1 and CE2 are covered by the first alignment film AL1. The first alignment film AL1 also covers the fifth insulating film 15. Here, the common electrodes CE1 and CE2 are equivalent to a first transparent electrode and a second transparent electrode.

Here, let us focus on the relationship in position between the signal line S3, the metallic wiring line M3 and the common electrode CE2. The common electrode CE2 comprises an electrode portion EL located immediately above the signal line S3 and the metallic wiring line M3. The electrode portion EL has a width W1 along the first direction X. The gap GPa between the pixel electrode PE2 and the metallic wiring lines M3 has a width W2 along the first direction X, and the gap GPb between the pixel electrode PE3 and the metallic wiring line M3 has a width W4 along the first direction X. For example, the width W2 and the width W4 are substantially equal to each other. The metallic wiring line M3 has a width W3 along the first direction X. The width W1 of electrode portion EL is equal to or greater than the sum of, for example, the width W2 of the gap GPa, the width W3 of the metallic wiring line M3 and the width W4 of the gap GPb. Moreover, the metallic wiring line M3, the gap GPa and the gap GPb are arranged in the region which overlaps the electrode portion EL in the third direction Z. In this embodiment, the width W1 is 10 µm, both the width W2 and the width W4 are 2 µm and the width W3 is 5 µm, an end portion of the electrode portion EL is located immediately above the pixel electrode PE2, and the other end portion of the electrode portion EL is located immediately above the pixel electrode PE3.

The first insulating films 11, the second insulating film 12, the third insulating film 13 and the fifth insulating film 15 are formed from, for example, an inorganic material such as silicon oxide or silicon nitride. Further, the fourth insulating film 14 is formed from, for example, an organic material such as transparent resin.

The second substrate SUB2 is formed from the second insulating substrate 20, which is a substrate which has light transmissivity, such as a glass substrate or a resin substrate. The second substrate SUB2 comprises, on a surface 20A side of the second insulating substrate 20, which opposes the first substrate SUB1, a light-shielding layer BM, color filters CF1 to CF3, an overcoat layer OC, a second alignment film AL2 and the like.

The light-shielding layer BM is disposed on the surface 20A of the second insulating substrate 20, which opposes the first substrate SUB1. The light-shielding layer BM is formed of, for example, a black resin material. The color filters CF1 to CF3 are arranged on the surface 20A of the second insulating substrate 20 so that an end portion of each overlaps the light-shielding layer BM. The color filters CF1 to CF3 are formed from resin materials colored in different colors, for example, red, blue and green, respectively. The color filters CF1 to CF3 are located in the openings OP1 to OP3, respectively, to oppose the pixel electrodes PE1 to PE3, respectively.

The overcoat layer OC covers the color filters CF1 to CF3. The overcoat layer OC is formed from a transparent resin material. The second alignment film AL2 covers the overcoat layer OC. The first alignment film AL1 and the second alignment film AL2 are formed from, for example, a material exhibiting horizontal alignment properties.

The first substrate SUB1 and the second substrate SUB2 described above are arranged so that the first alignment film AL1 and the second alignment film AL2 oppose each other. During this arrangement, a predetermined cell gap is formed by a spacer (not shown) between the first substrate SUB1 and the second substrate SUB2. The first substrate SUB1 and the second substrate SUB2 are attached together with a sealing member while maintaining the cell gap. The liquid crystal layer LQ is formed of a liquid crystal composition enclosed in the cell gap.

Figure 5:
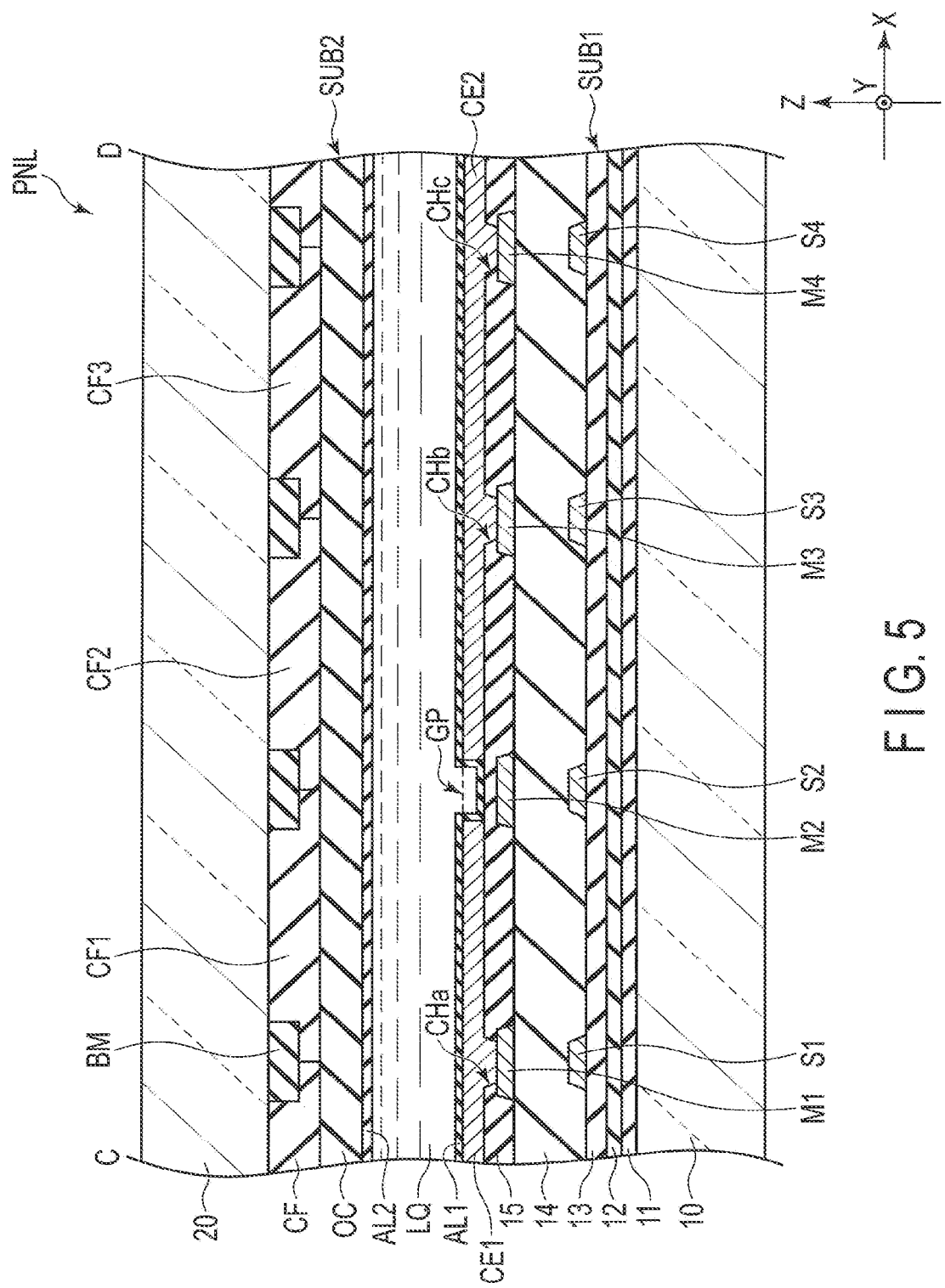
FIG. 5 is a cross section showing the structure of the display panel taken along line C-D of FIG. 3.

FIG. 5 is a cross section showing the structure of the display panel PNL taken along line C-D in FIG. 3.

Contact holes CHa, CHb and CHc are formed in the fifth insulating film 15. The metallic wiring line M1 is connected to the common electrode CE1 through the contact hole CHa. The metallic wiring line M3 is connected to the common electrode CE2 through the contact hole CHb. The metallic wiring line M4 is connected to the common electrode CE2 through the contact hole CHc. Therefore, the common electrodes CE1 and CE2 and the metallic wiring lines M1, M3 and M4 are at the same potentials, respectively. Thus, by connecting the metallic wiring lines M1, M3 and M4 to the common electrodes CE1 and CE2, the resistances of the common electrodes CE1 and CE2 are lowered.

According to this embodiment, the common electrodes CE1 and CE2 are arranged above the pixel electrodes PE1 to PE3. Further, the gap GP between the common electrodes CE1 and CE2 is formed in a position which overlaps the signal line S2 and the metallic wiring line M2. With this structure, the metallic wiring line M2 shields the electric field generated between the signal line S2 and the common electrodes CE1 and CE2. Therefore, it is possible to suppress leakage of electric field from the signal line S2 to the liquid crystal layer LQ through the gap GP. Thus, an alignment error of the liquid crystal element, which may be caused by the leakage of electric field in the gap GP, can be inhibited, thereby making it possible to suppress non-uniformity in display near the gap GP. Thus, it becomes possible to suppress the degradation of display quality.

Moreover, the non-uniformity in display near the gap GP can be suppressed, and therefore the degree of freedom of the position where the gap GP to be formed can be improved. More specifically, when non-uniformity in display occurs near the gap GP, it is necessary to arrange the position of the gap GP to between color pixels, where non-uniformity in display is inconspicuous. For example, when the display panel PNL comprises three color filters of red, blue and green, the position to form the gap GP is limited to between a red pixel and a blue pixel. By contrast, according to this embodiment, the position of the gap GP is not limited, but may be located between any of the color pixels.

Moreover, the width W2 of a gap GPa between the pixel electrode PE2 and the metallic wiring line M3 and the width W4 of a gap GPb between the pixel electrode PE3 and the metallic wiring line M3 are substantially the same. In other words, the metallic wiring line M3 is located in a position at an equal interval from both of the opening OP2 and the opening OP3. With this arrangement, it becomes possible to solve such drawbacks in viewing that color mixture occurs between adjacent color filters when the display panel PNL is observed from an oblique direction inclined from its normal, and color shift results from the ratio in opening area varies from one color pixel to another. In addition, similarly, the metallic wiring line M2 which overlaps the gap GP is disposed in a position at an equal interval from both of the opening OP2 and the opening OP3; therefore the non-uniformity in display near the gap GP, which may be caused by color mixture and color shift also can be suppressed.

Moreover, the metallic wiring line M2 is disposed between the pixel electrode PE1 and the pixel electrode PE2, to overlap the signal line S2. Therefore, the signal line S2 is capacitively coupled to the metallic wiring line M2, the parasitic capacitance between the signal line S2 and the pixel electrodes PE1 and PE2 can be reduced.

Next, the structure of the switching element shown in FIG. 3 will be described in detail.

FIG. 6 is a plan view showing an example of the structure of the switching element TR1.

Note that only the portion in the first substrate SUB1 necessary for the explanation will be illustrated, and the common electrodes or the like are omitted here. Further, the switching elements TR2 and TR3 shown in FIG. 3 have the same structure as that of switching element TR1, and therefore the explanation will be provided focusing on the structure of the switching element TR1.

The switching element SWG1 comprises a semiconductor layer SC and a relay electrode RE. The semiconductor layer SC is formed to be substantially U-shaped, and crosses the scanning line G2 at two points. The semiconductor layer SC includes end portions E12 and E13. The end portion E11 is electrically connected to the signal line S2 through a contact hole CH11. The end portion E12 is electrically connected to the relay electrode RE through a contact hole CH12. The relay electrode RE1 is located between the signal lines S1 and S2. In the scanning line G2, the two portions which cross the semiconductor layer SC serve as gate electrodes G11 and G12, respectively. A light-shielding body SL1 is located at a position where the semiconductor layer SC and the gate electrode G12 overlap. The relay electrode RE is electrically connected to a pixel electrode PE1 through a contact hole CH1.

FIG. 7 is a cross section showing the structure of the first substrate SUB1 including the switching element TR1 taken along line E-F in FIG. 6. Note that in the example illustrated, the switching element TR1 is of a top-gate type, but it may be of a bottom-gate type.

The shielding body SI is disposed on the first insulating substrate 10 and is covered by the first insulating film 11. The semiconductor layer SC is disposed on the first insulating film 11 and is covered by the second insulating film 12. The semiconductor layer SC is formed of, for example, polycrystalline silicon, but may be formed of amorphous silicon, an oxide semiconductor or the like.

The gate electrodes G11 and G12 are disposed on the second insulating film 12 and are covered by the third insulating film 13. The gate electrodes G11 and G12 oppose the semiconductor layer SC via the second insulating film 12. The gate electrode G12 is located above the light-shielding body SI. The signal line S2 and the relay electrode RE are disposed on the third insulating film 13 and are covered by the fourth insulating film 14. The signal line S2 is connected to the semiconductor layer SC1 through the contact hole CH11 which penetrates the second insulating film 12 and the third insulating film 13. The relay electrode RE1 is connected to the semiconductor layer SC1 through the contact hole CH12 which penetrates the second insulating film 12 and the third insulating film 13.

The metallic wiring lines M2 and the pixel electrodes PE1 and PE4 are disposed on the fourth insulating film 14 and are covered by the fifth insulating film 15. The pixel electrode PE1 is connected to the relay electrode RE through the contact hole CH1 penetrating the fourth insulating film 14. The common electrode CE1 is formed on the fifth insulating film 15 and is covered by the first alignment film AL1. Further, in FIG. 3, the gap GP is formed in a position which overlaps the metallic wiring line M2 as seen in plan view, and also in FIG. 7, the gap GP is formed, as a region where the common electrode is not disposed, in a position which overlaps the metallic wiring line M2.

FIG. 8 is a plan view showing the relationship in width between the metallic wiring line M3 and the contact hole CHb. As shown in FIG. 4, the metallic wiring line M3 has the width W3 along the first direction X. Further, as shown in FIG. 5, the metallic wiring line M3 is connected to the common electrode CE2 through the contact hole CHb. In the example shown in FIG. 8, the contact hole CHb has the width W11 along the first direction X.

FIG. 8, section (a) is a plan view showing the relationship in width between the metallic wiring line M3 and the contact hole CHb shown in FIG. 5. In the example shown in FIG. 8, section (a), the metallic wiring line M3 is formed into a belt-like shape having a substantially fixed width W3 therethrough. Here, the width W11 is less than the width W3.

FIG. 8, sections (b) and (c) are diagram showing the relationship in width between the metallic wiring line M3 and the contact hole CHb in other examples.

In the example shown in FIG. 8 (b), the metallic wiring line M3 is formed into a belt-like shape having a substantially fixed width W3 therethrough. Here, the width W11 is greater than the width W3. In order to make the contact areas between the common electrodes and metallic wiring lines, it is preferable that the center of the contact hole CHb, which is the position equivalent to one half of the width W11 and the center of the metallic wiring line M3, which is the position equivalent to one half of the width W3 overlap. Note that the relationship between the width W11 and width W3 is not limited to the example illustrated, but the width W11 and the width W3 may be equal to each other.

In the example shown in FIG. 8, section (c), the metallic wiring line M3 includes an expanded portion M31 in a position which overlaps the contact hole CHb. The expanded portion M31 has a width W31 along the first direction X. The width W31 is greater than the width W3. Further, the width W11 is less than the width W31. In FIG. 8, section (c), the position equivalent to one half of the width W3 and the position equivalent to one half of the width W31 are located on a straight line, for example. It is desirable that the center of the contact hole CHb, which is the position equivalent to one half of the width W11 and the center of the metallic wiring line M31, which is the position equivalent to one half of the width W31 overlap each other. Note that the relationship between the width W11 and the width W31 is not limited to that of the example illustrated, but the width W11 and width W31 may be have equal to each other.

As long as the contact hole CHb and the metallic wiring line M3 are arranged in the positions overlapping each other, the center of the contact hole CHb and the center of the metallic wiring line M3 may be deviated from each other. Moreover, the relationship between the metallic wiring line M3 and the contact hole CHb in width is applied similarly to that of the metallic wiring line M1 and the contact hole CHa and that of the metallic wiring line M4 and the contact hole CHc.

Figure 9:
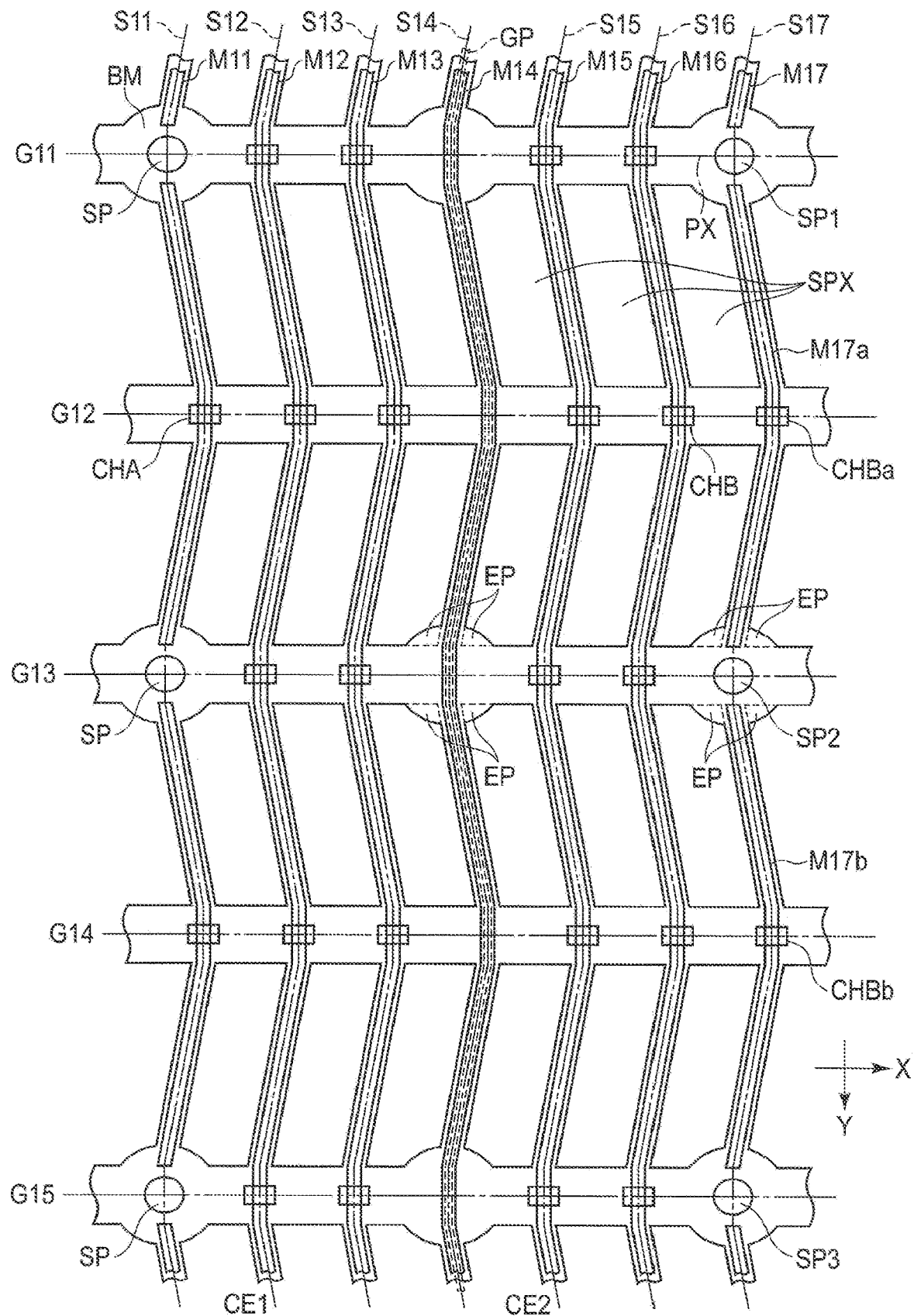
FIG. 9 is a plan view showing the positions of light-shielding layers, metallic wiring lines, spacers, contact holes and the like, with relative to each other.

FIG. 9 is a plan view showing the spatial relationship of the light-shielding layer BM, the metallic wiring lines M11 to M17 and the spacers SP1 to SP3 and the like. Here, such a case is shown where one pixel PX includes, for example, three sub pixels SPX. Note that the scanning lines and the signal lines are illustrated by the alternate long and short dash lines in the figure.

The metallic wiring lines M11 to M17 has overlap the signal lines S11 to S17, respectively. The gap GP between the common electrodes CE1 and CE2 overlaps the signal line S14 and the metallic wiring line M14. The light-shielding layer BM is arranged in a position which overlaps each of the scanning lines G11 to G15 and the signal lines S11 to S17 and is formed into a shape of a grid. The contact holes CHA which connect the common electrode CE1 to each of the metallic wiring lines M11 to M13 are located near the intersections of the scanning lines G11 to G15 and the signal lines S11 to S13. The contact holes CHB which connect the common electrode CE2 to each of the metallic wiring lines M15 to M17 are located near the intersections of the scanning lines G11 to G15 and the signal lines S15 to S17. However, in a position where the signal line S14 and the metallic wiring lines M14 overlap, neither the contact hole CHA or CHB is provided. Further, the spacer SP is provided at the intersection of a scanning line and a signal line, but is not provided to overlap the signal line S14 which overlaps the gap GP. In the position which overlaps the spacer, neither the contact hole CHA or CHB is provided. Further, the metallic wiring line is interrupted at the position which overlaps the spacer SP.

The above-described points will be explained in detail focusing on the metallic wiring line M17, the spacers SP1 to SP3 and the like, but the explanation of the spatial relationship between the other metallic wiring lines and spacers will be omitted on the assumption that they have a similar structure to this.

As in the case of the spacer SP shown in FIG. 2, the spacers SP1 to SP3 are arranged between the first substrate SUB1 and the second substrate SUB2. The spacers SP1 to SP3 are arranged in positions which overlap the signal line S17. In the example illustrated, the spacer SP1 is located in the intersection of the scanning line G11 and the signal line S17, the spacer SP2 is located in the intersection of the scanning line G13 and the signal line S17, and the spacer SP3 is located in the intersection of the scanning line G15 and the signal line S17. The metallic wiring line M17 is interrupted at the positions which overlap the spacers SP1 to SP3, and includes a first portion M17a and a second portion M17b. The second portion M17b is located to be separated from the first portion M17 with a gap. The first portion M17a is located between the spacer SP1 and the spacer SP2, and the second portion M17b is located between the spacer SP2 and the spacer SP3. That is, the spacer SP2 is located between the first portion M17a and the second portion M17b. A contact hole CHBa is located between the spacer SP1 and the spacer SP2, and a contact hole CHBb is located between the spacer SP2 and the spacer SP3. The first portion M17a is connected to the common electrode CE2 through the contact hole CHBa near the position which crosses the scanning line G12. The second portion M17b is connected to the common electrode CE2 through the contact hole CHBb near the position which crosses the scanning line G14. With this structure, the first portion M17a and the second portion M17b are suppressed from being in a floating state. Further, in order to even the resistances of the first portion M17a and the second portion M17b with each other, the contact holes CHBa and CHBb should preferably be formed, respectively, in the centers of the widths along in the second direction Y of the first portion M17a and the second portion M17b.

In the positions where the spacers SP1 to SP3 are arranged, none of the metallic wiring lines or the contact holes is formed, but the positions overlap the region where the projections and recesses are eased. Therefore, it is possible to suppress display error which may be caused by the spacers SP1 to SP3 damaging the first alignment film AL1 when a pressing force is applied from outside while the spacers SP1 to SP3 are in contact with the first substrate SUB1. Further, the spacers SP1 to SP3 are in contact the flat region which is not affected from the projections and recesses made by the metallic wiring lines etc., in the first substrate SUB1. Therefore, it is possible to suppress the lowering of the tolerance to the pressing force, caused by the decrease of the area where the first substrate is in contact with the spacers SP1 to SP3.

In order to avoid the risk of short-circuiting of the common electrode, the contact hole which connects the metallic wiring line M14 to the common electrode is not formed in the region of the display area which overlaps the gap GP. The metallic wiring line M14 is connected to the common electrode CE1 in the non-display area. Moreover, in order to avoid the metallic wiring lines M14 from being in the floating state, a spacer is not arranged in the position which overlaps the signal line S14 and the gap GP.

The light-shielding layer BM comprises expanded portions EP in the positions which overlap the spacers SP. The light-shielding layer BM further comprises expanded portions EP also in the positions which overlap with the gap GP. The expanded portions EP are formed in four surrounding Subpixels around each spacer SP. The expanded portions EP are formed for every one pixel PX along the first direction X and for every two pixels PX along the second direction Y. With this configuration, it is possible to suppress variation in opening area among the pixels PX.

In addition, the metallic wiring lines M12, M13, M15 and M16 are connected to the respective common electrodes by the contact holes formed for every on pixel PX along the second direction Y, but the contact holes can be thinned out depending on the resistance of the common electrodes.

Figure 10:
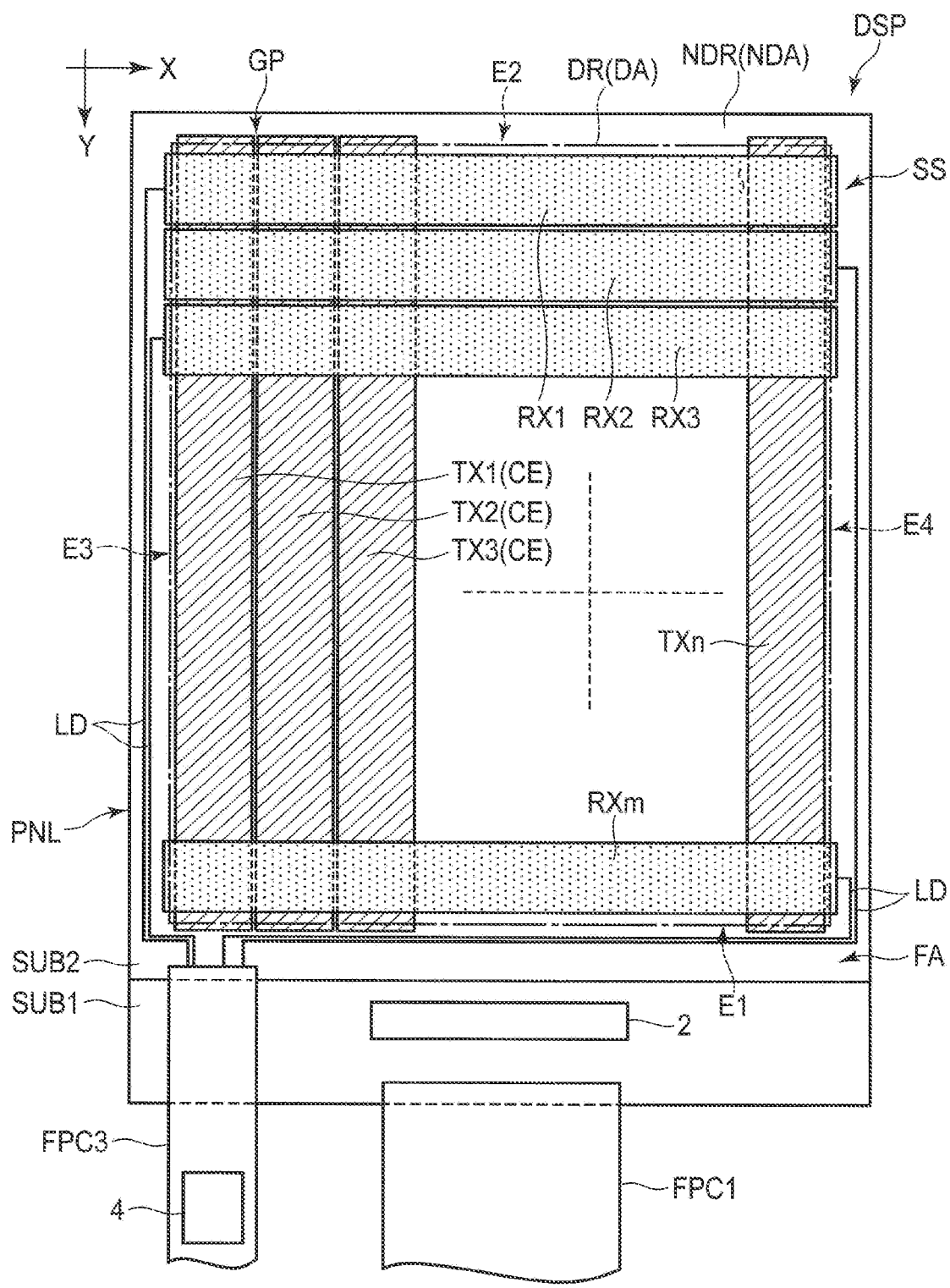
FIG. 10 is a plan view showing the structure of a part of the display device.

FIG. 10 is a plan view showing a structural example of a sensor device SS of the display device DSP. The sensor device SS comprises a plurality of drive electrodes TX1 to TXn, a plurality of detection electrodes RX1 to RXm, flexible wiring board FPC3, a touch-detection IC chip 4, and the like. Note that n and m are integers greater than or equal to 2, for example. The drive electrodes TX1 to TXn are arranged on the first substrate SUB1 and are equivalent to the common electrodes described above. The detection electrodes RX1 to RXm are arranged, for example, on a surface of the second substrate SUB2, which is opposite to the surface opposing the first substrate SUB1. The flexible wiring board FPC3 is connected to the second substrate SUB2. The touch-detection IC chip 4 is mounted on the flexible wiring board FPC3.

The sensor device SS includes a detection region DR which detects an object to be detected, and a non-detection region NDR outside of the detection region DR. The detection region DR overlaps the display area DA of the display device DSP, and the non-detection region NDR overlaps the non-display area NDA. Note that the display area DA and the detection region DR or the non-display area NDA and the non-detection region NDR, respectively, may not be same region. The display area DA and the detection region DR each comprise a first end E1 and a second end E2 along the first direction X, and a third end E3 and a fourth end E4 along the second direction Y, and are each formed into approximately a rectangular shape.

As shown in FIG. 10, the drive electrodes TX1 to TXn are each formed into a belt-like shape, and are arranged to extend from the first end E1 to the second end E2 along the second direction Y, with a gap therebetween along the first direction X. That is, the gaps between adjacent pairs of the drive electrodes are equivalent to the gaps GP between the common electrodes. In other words, the gaps GP extend from the first end E1 to the second end E2 as seen in plan view. In this embodiment, the drive electrodes TX1 to TXn are formed to extend to the non-display area NDA. Here, the drive electrode TX1 is equivalent to the first sensor electrode, and the drive electrode TX2 is equivalent to the second sensor electrode.

The detection electrodes RX1 to RXm are each formed into a belt-like shape, and are arranged to extend from the third end E3 to the fourth end E4 along the first direction X with gaps therebetween along the second direction Y. The detection electrodes RX1 to RXm cross the drive electrodes TX1 to TXn in the display area DA or the detection region DR. The detection electrodes RX1 to RXm are electrically connected to the flexible wiring board FPC3 by lead lines LD located in the non-display area NDA or the non-detection region NDR. Here, the lead lines LD are electrically connected with the detection electrodes RX1 to RXm, respectively, one by one. Although, here, the detection electrodes RX1 to RXm are formed from, for example, a transparent conductive material such as ITO and IZO, they may be formed from metal wires in a mesh or thin line state, or a layered structure of metal wires and a transparent conductive layer, or the like. The lead lines LD should preferably be formed from metal thin wires from a view point of lowering the resistance.

In the example illustrated, the sensor SS to be applied to the mutual capacitive mode is used, but when the sensor SS is used for the self-capacitive mode, the drive electrodes TX shown in FIG. 10 are not provided, but the detection electrodes RX are provided. In this case, the detection electrodes RX are each formed into a belt-like shape, and arranged to extend from the first end E1 to the second end E2 along the second direction Y with gaps along the first direction X.

Next, the operation of the sensing to detect approaching or contacting of an object to detect with respect to the display device DSP will be described. Note that the mode of the sensing described here may be called a mutual-capacitive sensing mode. In the mutual-capacitive mode, objects are detected based on the variation in capacitance between the drive electrodes TX and the respective detection electrodes RX.

FIG. 11 is a diagram which illustrates the principle of the sensing method of the mutual-capacitive mode. Here, data entry with a finger Fg as a conductive object to be detected through the display device DSP will be described.

The drive electrodes TX and the detection electrodes RX are static-capacitively coupled with each other and inter-electrode capacitances Cc are formed between the drive electrodes TX and the respective detection electrodes RX. Let us assume the case where the finger Fg approaches a detection electrode RX from the opposite side to the side of the detection electrodes RX, which opposes the drive electrodes TX. Here, the location of the finger Fg on the X-Y plane is set as a location LC. At the position LC, the coupling capacitance Cx is formed between the finger Fg and the detection electrode RX.

When the sensing is performed, first, a pulse-form sensor driving signal Vw is written to the drive electrodes Tx, and then a sensor signal is generated according to the variation in capacitance Cc between the drive electrode Tx and the detection electrode Rx as described above. Next, the touch-detection IC chip 4 reads the pulse-form detection signal Vr indicating the variation of the sensor signal, from the detection electrode Rx. The location of the finger Fg can be detected based on the timing of the sensor drive signal Vw being supplied to the drive electrode Tx and the detection signal Vr from the detection electrode Rx.

The display drive and sensing drive of the display device DSP carried out, for example, within one-frame period. In one example, one-frame period is divided into a first period for displaying images and a second period for detecting an object. In the first period, the display drive in which video signals are written in all pixels PX, respectively, in the display area DA is carried out in the time-division manner (the display period). In the second period following the first period, the sensing drive in which an object is detected in the entire display area DA in the time-division manner (the detection period or sensing period). To the drive electrodes Tx, the common drive signal is supplied in the first period and the sensor drive signal is supplied in the second period.

The sensing by the mutual-capacitive mode is discussed here, but the sensor device may be configured to carry out sensing by a self-capacitive mode.

Figure 12:
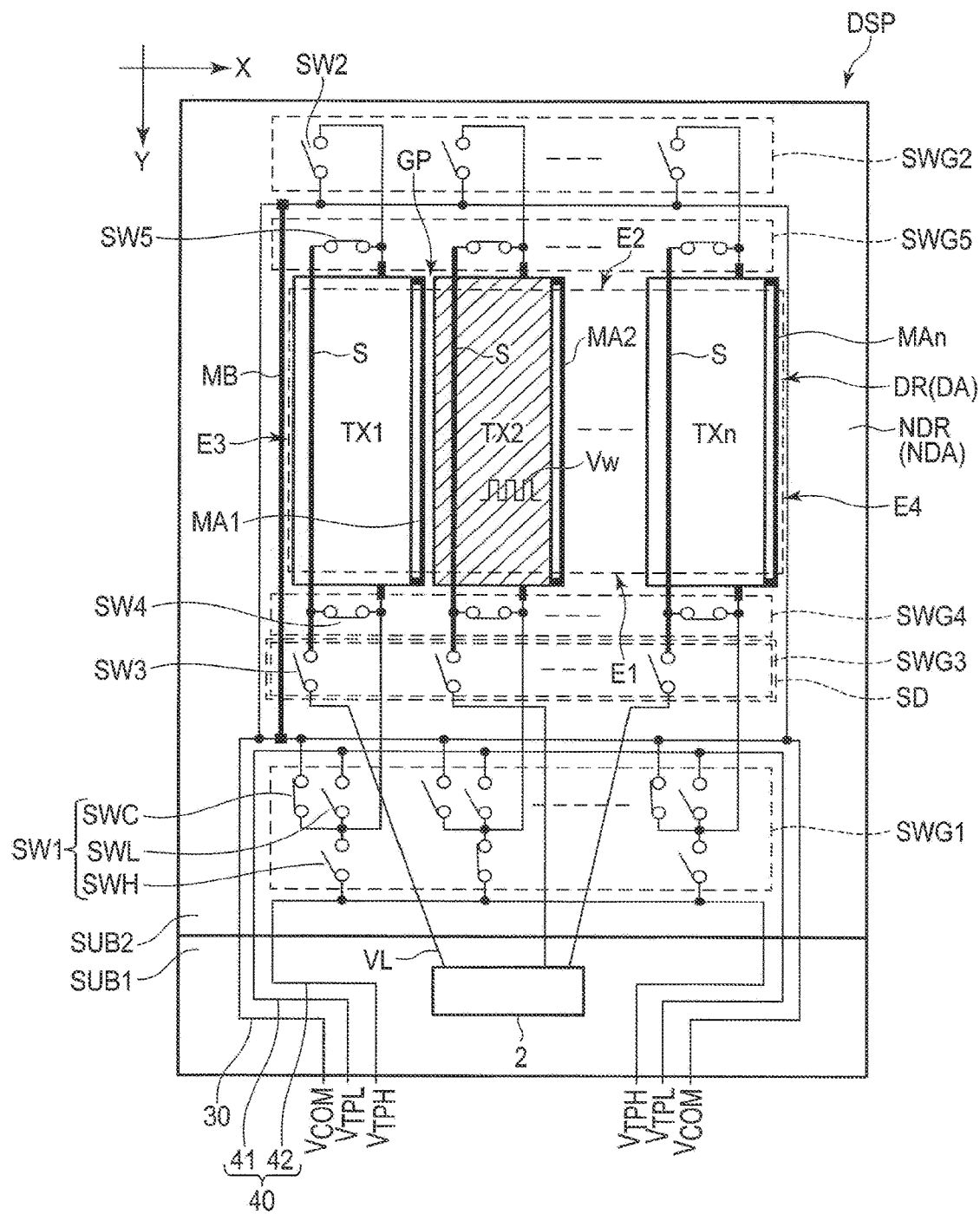
FIG. 12 is a plan view schematically showing an equivalent circuit connected to the drive electrodes.

FIG. 12 is a plan view schematically showing an equivalent circuit connected to the drive electrodes TX1 to TXn.

In the example illustrated, the display device DSP comprises a first switch group SWG1, a second switch group SWG2, a third switch group SWG3 formed in a selector SD, a fourth switch group SWG4, a fifth switch group SWG5, a first supply line 30, second supply lines 40, and the like.

In the example illustrated, the first to fifth switch groups SWG1 to SWG5 are formed in respective regions which overlap the second substrate SUB2 as seen in plan view. The first switch group SWG1, the selector SD (the third switch group SWG3) and the fourth switch group SWG4 are located closer to the drive IC chip 2 than the display area DA. The third switch group SWG3 is arranged between the first switch group SWG1 and fourth switch group SWG4. Further, the second switch group SWG2 and the fifth switch group SWG5 are located on a side of the display area DA, which is opposite to the drive IC chip 2 side. The fifth switch group SWG5 is located between the second switch group SWG2 and the display area DA.

The selector SD is connected to the drive IC chip 2 through a plurality of video lines VL. The selector SD is controlled by the drive IC chip 2 to selectively supply video signals to the signal lines S. Note that the third switch group SWG3 is contained in the selector SD, and it may be called a multiplexer.

The common voltage VCOM for image display is applied to the first supply line 30. The first supply line 30 is wired along both sides of the drive IC chip 2 and both sides of the first switch group SWG1, and then branched off therefrom. Further, one side passes between the first switch group SWG1 and the third switch group SWG3, and the other side is extended towards the second switch group SWG2 to pass between the second switch group SWG2 and the fifth switch group SWG5, to be connected to the second switch group SWG2.

To the second supply lines 40, the driving signal for touch detection is supplied. In this embodiment, the second supply lines 40 include a low-voltage line 41 to which a first voltage VTPL is applied and a high-voltage line 42 to which a second voltage VTPH higher than the first voltage VTPL is applied. The low-voltage line 41 passes along both sides of the drive IC chip 2 and is wired to pass through between the first switch group SWG1 and the third switch group SWG3. The high-voltage line 42 passes along both sides of the drive IC chip 2 and is wired to pass through between the first switch group SWG1 and the drive IC chip 2.

For example, the first supply line 30, the low-voltage line 41 and the high-voltage line 42 are connected to the touch-detection IC chip 4 through the flexible wiring board FPC3. The first supply line 30, the low-voltage line 41 and the high-voltage line 42 may be connected to the drive IC chip 2.

The first switch group SWG1 comprises a plurality of switches SW1 provided for the drive electrodes TX1 to TXn, respectively. The switches SW1 switch the connection of the drive electrodes TX1 to TXn between the first supply line 30 and the second supply lines 40 (the low-voltage line 41 or the high-voltage line 42). Each of the switches SW1 includes a common voltage switch SWC which connects between the respective one of the drive electrodes TX1 to TXn and the first supply line 30 or disconnects them, a low-voltage switch SWL which connects between the respective one of the drive electrodes TX1 to TXn and the low-voltage line 41 or disconnect them and a high-voltage switch SWH which connects between the respective one of the drive electrodes TX1 to TXn and the high-voltage line 42 or disconnect them. For example, the common voltage switch SWC, the low-voltage switch SWL and the high-voltage switch SWH are all turned on or off under the control of the drive IC chip 2.

The second switch group SWG2 comprises a plurality of switches SW2 provided for the drive electrodes TX1 to TXn, respectively. Each of the switches SW2 connects between the respective one of the drive electrodes TX1 to TXn and the first supply line 30 or disconnects them. For example, each switch SW2 is turned on or off under the control of the drive IC chip 2. The third switch group SWG3 comprises a plurality of switches SW3 provided for the signal lines S, respectively, provided in the display area DA. Each of the switches SW3 is connected to the drive IC chip 2 through the respective video line VL, and connects between the respective one of the signal lines S and the drive IC chip 2, or disconnects them. For example, the third switch SW3 is turned on or off to sequentially supply the video signals to be supplied to the respective pixel electrodes in time-division manner under the control of the drive IC chip 2.

The fourth switch group SWG4 comprises a plurality of switches SW4 provided for the signal lines S, respectively. Each of the switches SW4 connects between a respective one of the signal lines S and a respective one of the drive electrodes TX1 to TXn, or disconnects them. For example, each switch SW4 is turned on or off under the control of the drive IC chip 2.

The fifth switch group SWG5 comprises a plurality of switches SW5 provided for the signal lines S, respectively. Each of the switches SW5 connects between a respective one of the signal lines S and a respective one of the drive electrodes TX1 to TXn, or disconnects them. For example, each switch SW5 is turned on or off under the control of the drive IC chip 2.

In the example illustrated, the metallic wiring lines MA1 to MAn are connected respectively to the drive electrodes TX1 to TXn, which are adjacent thereto on a left-hand side thereof. The metallic wiring lines MA1 to MAn are connected to the drive electrodes TX1 to TXn, respectively, in the non-detection region NDR. Further, the metallic wiring lines MA1 to MAn are connected to the drive electrodes TX1 to TXn, respectively, in the non-display area NDA. Of the metallic wiring lines MA1 to MAn, those other than the metallic wiring line MAn are arranged to respectively overlap the gaps GP between adjacent pairs of the drive electrodes TX1 to TXn. The metallic wiring lines MAn disposed along the fourth end E4 of the display area DA.

The metallic wiring lines MA1 to MAn overlap the signal lines (not shown). The signal lines arranged to overlap the metallic wiring lines MA1 to MAn are also connected to the drive electrodes TX1 to TXn, respectively, which are adjacent thereto on a left-hand side thereof. Note that, for example, with the structure shown in FIGS. 4 and 6, the signal line S2 is connected to the pixel electrode PE1 on the left-hand side thereof, and the metallic wiring lines M2 is electrically connected to the common electrode CE1 on the left-hand side thereof in the non-display area.

The metallic wiring line MB is arranged along the third end E3 of the display area DA. The metallic wiring line MB is connected to the first supply line 30 to which the common voltage VCOM is applied.

As described above, the metallic wiring line MB is disposed along the third end E3, and the metallic wiring line MAn is disposed along the fourth end E4. With this structure, when the first substrate SUB1 and the second substrate SUB2 are attached together while being shifted along the first direction X, those pixels located by the side of the third end E3 and those by the side of the fourth end E4 can have the equivalent area which contributes to display. Moreover, since the common voltage VCOM is applied to the metallic wiring line MB, coupling, which may be created between the metallic wiring lines MB and drive electrode TX1 adjacent thereto on the right-hand side thereof can be avoided.

Here, the operation of the switch groups SWG1 to SWG5 in the first period and the second period will be described.

In the first period, in which images are displayed, the common voltage switches SWC of the switches SW1, the switches SW2 and the switches SW3 are all turned on, and the switches SW4 and the switches SW5 are all turned off. Thereby, the common voltage VCOM is applied to each of the drive electrodes TX1 to TXn. Further, video signals are supplied to the signal lines S from the drive IC chip 2.

In the second period, in which sensing is carried out to detecting approaching or contacting of an object with respect to the display device DSP, the sensor driving signal Vw is sequentially supplied to the drive electrodes TX1 to TXn, for example. The drive electrodes TX to which the sensor driving signal Vw is to be supplied (to be called as drive object), and the rest of the drive electrodes TX have different connection modes in the switches SW1. FIG. 12 shows the case where the drive electrode TX2 is a drive object. Here, the common voltage switch SWC of the drive electrode TX2, which is a drive object, is turned off, and the common voltage switches SWC of the rest of the drive electrodes TX are all on. All of the switches SW2 and switches SW3 are off, whereas all of the switches SW4 and switches SW5 are on.

The connection point of the drive electrode TX2, which is a drive object, is swung between the low-voltage line 41 and the high-voltage line 42. In other words, the low-voltage switch SWL and the high-voltage switch SWH provided to the drive electrode TX2 are switched on or off alternately. Thus, the sensor driving signal Vw toggles between the first voltage VTPL and the second voltage VTPH is generated and this sensor driving signal Vw is supplied to the drive electrode TX2. Based on the detection signals obtained from the detection electrodes with respect to this sensor driving signal Vw, the touch-detection IC chip 4 detects the location of the object to be detected, which may approach or contact the display device DSP.

Here, the switches SW4 and switches SW5 are on, and therefore the signal lines S are respectively at the same potentials as that of the respective drive electrode TX1 to TXn, to which they are connected. Thereby, the formation of the capacitance between the signal lines S and the drive electrodes TX1 to TXn can be prevented, thereby making it possible to increase the accuracy of touch detection. In the example illustrated, the each signal lines S are connected to the respective drive electrodes TX at both ends as viewed from the second direction Y side of each drive electrode TX, and thus the drive electrodes TX and the signal lines S are entirely and stably equalized in potential.

In the second period, in which sensing is carried out, the video lines VL between the drive IC chip 2 and the third switch group SWG3 are all in a floating state, thereby making it possible to reduce the generation of the unnecessary capacitance, which may result from the potential of each video line VL. Note that in the second period, all or part of the switches SW4 and switches SW5 may be set to off, thereby setting all or part of the signal lines S in the floating state.

The drive electrodes TX to be driven may be selected in the order from the drive electrode TX1 to the drive electrode TXn, or may be selected in some other order. Moreover, two or more drive electrodes TX may be simultaneously selected as drive objects. Furthermore, the drive electrodes TX1 to TXn may be selected all the way through as drive objects in one second period, or may be in distribution of two times or more of the second periods.

Figure 13:
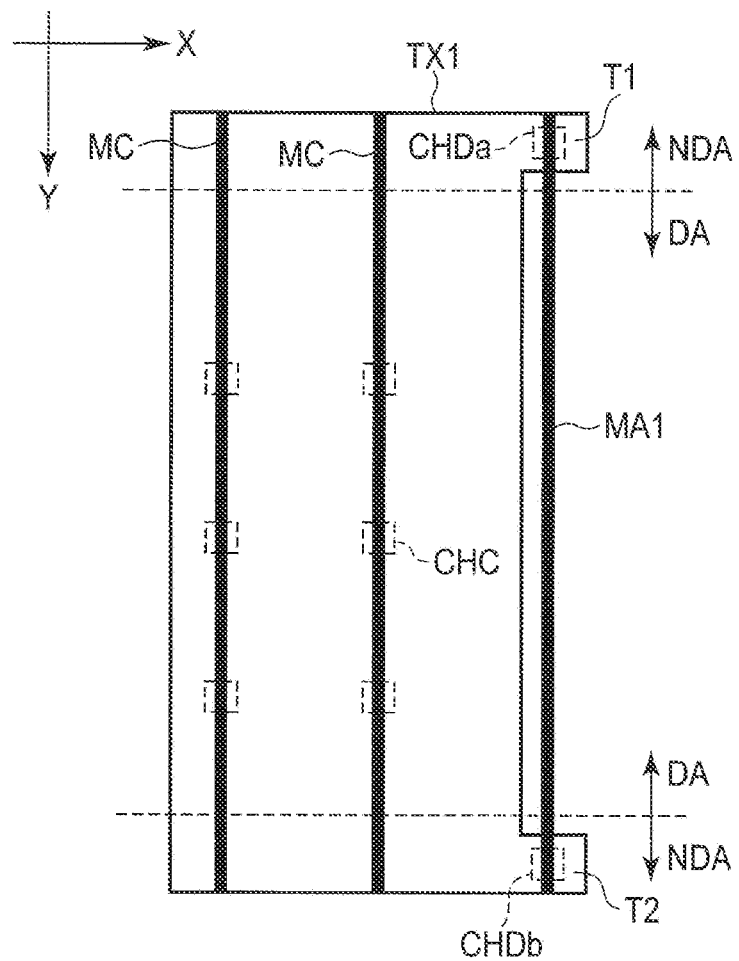
FIG. 13 is a plan view showing the connection relationship between drive electrodes and metallic wiring lines.

FIG. 13 is a plan view showing the connection relationship between the drive electrode TX1 and the metallic wiring line MA1.

In the example illustrated, the drive electrode TX1 comprises projecting portions T1 and T2 projecting in the first direction X. The projecting portions T1 and T2 are located in the non-display area NDA so as to be apart from the drive electrode TX2 shown in FIG. 12 with a gap therebetween. The metallic wiring line MA1 is located in a position which overlaps the gap GP between the drive electrode TX1 and the drive electrode TX2 as shown in FIG. 12. The metallic wiring line MA1 is connected to the projecting portion T1 through a contact hole CHDa formed to overlap the projecting portion T1 by one end side. Further, the metallic wiring line MA1 is connected to the projecting portion T2 through a contact hole CHDb formed to overlap the projecting portion T2 by the other end side. Note that the contact holes CHDa and CHDb are formed in the fifth insulating film 15 as in the case of the contact hole CHb shown in FIG. 5.

The metallic wiring lines MC are arranged to overlap drive electrode TX1 in different positions from the position which overlaps the gap GP. The metallic wiring lines MC are connected with drive electrode TX1 through the contact holes CHC in the display area DA. Note that the contact holes CHC are formed in the fifth insulating film 15 as in the case of the contact hole CHb shown in FIG. 5.

As described above, the metallic wiring line MA1 is connected to the detection electrode TX1 in the non-display area NDA.

FIG. 14 is a plan view showing another example of the connection relationship between the drive electrode TX1 and the metallic wiring line MA1. FIG. 14 is different in the structure that the metallic wiring line MA1 is connected to a connection electrode MD as compared to that shown in FIG. 13.

The metallic wiring lines MA1 and MC are arranged to extend in the non-display area NDA. The connection electrode MD is connected to the metallic wiring lines MA1 and MC in the non-display area NDA. That is, the metallic wiring line MA1, the metallic wiring lines MC and the connection electrode MD are at the same potential. Further, the metallic wiring line MA1, the metallic wiring lines MC and the connection electrode MD are connected to the drive electrode TX1 through the contact holes CHC. The connection electrode MD, the metallic wiring line MA1 and the metallic wiring lines MC are arranged on the fourth insulating film 14 as in the case of the metallic wiring lines M1 to M4 shown in FIG. 4. Furthermore, the connection electrode MD, the metallic wiring line MA1 and the metallic wiring lines MC are formed from the same material, for example.

As described above, the metallic wiring line MA1 is connected to the detection electrode TX1 in the non-display area NDA.

As discussed above, according to this embodiment, a display device and a sensor device, which can suppress deterioration of display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display area which displays images;
    a non-display area surrounding the display area;
    a first interlayer insulating film having a first bottom surface and a first top surface;
    a second interlayer insulating film disposed on the first top surface of the first interlayer insulating film and having a second bottom surface and a second top surface;
    a first signal line and a second signal line covered by the first bottom surface of the first interlayer insulating film;
    a first metallic wiring and a second metallic wiring sandwiched between the first top surface of the first interlayer insulating film and the second bottom surface of the second interlayer insulating film;
    a pixel electrode sandwiched between the first top surface of the first interlayer insulating film and the second bottom surface of the second interlayer insulating film; and
    a first common electrode and a second common electrode disposed on the second top surface of the second interlayer insulating film, wherein
    the first metallic wiring overlaps the first signal line and extends in parallel to the first signal line,
    the second metallic wiring overlaps the second signal line and extends in parallel to the second signal line,
    the pixel electrode is provided between the first metallic wiring and the second metallic wiring and overlaps the second common electrode,
    the first common electrode and the second common electrode are separated from each other with a gap therebetween,
    the gap overlaps the first signal line and the first metallic wiring, and
    the second signal line and the second metallic wiring overlap the second common electrode, the second metallic wiring is connected to the second common electrode through a first contact hole formed in the second interlayer insulating film in the display area, the first contact hole overlaps the second signal line, and the first metallic wiring is connected to the first common electrode through a second contact hole formed in the second interlayer insulating film in the non-display area.

2. The display device of claim 1, wherein
    the display area comprises a first end and a second end, and
    the gap overlaps the first metallic wiring and the first signal line, and is formed along the first signal line and the first metallic wiring to extend from the first end to the second end as seen in plan view.

3. The display device of claim 2, wherein
    the first common electrode and the second common electrode extend from the first end of the display area to the second end.

4. The display device of claim 1, further comprising:
a first substrate including the first common electrode, the second common electrode and the pixel electrode;
a second substrate which opposes the first substrate; and
a first spacer provided between the first substrate and the second substrate,
wherein
the first spacer is disposed in a position where the overlapping with the first signal line is avoided, but which overlaps the second signal line.

5. The display device of claim 4, wherein
the second metallic wiring includes a first portion and a second portion located apart from the first portion, and
the first spacer is disposed between the first portion and the second portion.

6. The display device of claim 5, further comprising:
a second spacer disposed between the first substrate and the second substrate in a position which overlaps the second signal line,
wherein the first portion of the second metallic wiring is located between the first spacer and the second spacer.

7. The display device of claim 6, wherein
the first contact hole is located between the first spacer and the second spacer.

8. The display device of claim 2, wherein
the display area further comprises a third end and a fourth end,
the display device further comprises:
a third metallic wiring provided along the third end; and
a fourth metallic wiring provided along the fourth end, and
the third metallic wiring and the fourth metallic wiring are sandwiched between the first top surface of the first interlayer insulating film and the second bottom surface of the second interlayer insulating film.

9. A sensor device comprising:
a detection region to detect a position of a detection object;
a non-detection region located outside the detection region;
an interlayer insulating film having a bottom surface and a top surface;
a first metallic wiring covered by the bottom surface;
a second metallic wiring covered by the bottom surface and located apart from the first metallic wiring; and
first and second sensor electrodes provided on the top surface of the interlayer insulating film, wherein
the first sensor electrode and the second sensor electrode are separated from each other with a gap therebetween,
the gap overlaps the first metallic wiring,
the second metallic wiring overlaps the second sensor electrode, and
the second metallic wiring is connected to the second sensor electrode through a first contact hole formed in the interlayer insulating film in the detection region, and the first metallic wiring is connected to the first sensor electrode through a second contact hole formed in the interlayer insulating film in the non-detection region.

10. The sensor device of claim 9, wherein
the detection region comprises a first end and a second end, and
the gap is formed along the first metallic wiring to extend from the first end to the second end as seen in plan view.

11. The sensor device of claim 10, wherein
the first sensor electrode and the second sensor electrode extend from the first end to the second end.

12. The sensor device of claim 10, wherein
the detection region further comprises a third end and a fourth end,
the display device further comprises:
a third metallic wiring provided along the third end; and
a fourth metallic wiring provided along the fourth end, and
third and fourth metallic wiring are covered by the bottom surface of the interlaver insulating film.

13. A display device comprising:
a first interlayer insulating film having a first bottom surface and a first top surface;
a second interlayer insulating film disposed on the first top surface of the first interlayer insulating film and having a second bottom surface and a second top surface;
an alignment film disposed on the second top surface of the second interlayer insulating film;
a signal line covered by the first bottom surface of the first interlayer insulating film:
a metallic wiring being in contact with the first top surface of the first interlayer insulating film and the second bottom surface of the second interlayer insulating film; and
first and second transparent electrodes being in contact with the top surface of the second interlayer insulating film and the alignment film, wherein
the first transparent electrode and the second transparent electrode are separated from each other with a gap therebetween,
the gap overlaps the signal line and the metallic wiring, and
the metallic wiring is electrically connected to the first transparent electrode through a contact hole formed in the second interlayer insulating film.

14. The display device of claim 13, further comprising:
a display area which displays images; and
a non-display area surrounding the display area,
wherein
the display area comprises a first end and a second end,
the gap is formed along the signal line and the metallic wiring to extend from the first end to the second end as seen in plan view, and
the contact hole located in the non-display area.

15. The display devices of claim 14, wherein
the first transparent electrode and the second transparent electrode extend from the first end to the second end.

* * * * *